No. 783,484. PATENTED FEB. 28, 1905.
J. THOMSON.
WATER METER.
APPLICATION FILED OCT. 19, 1903.
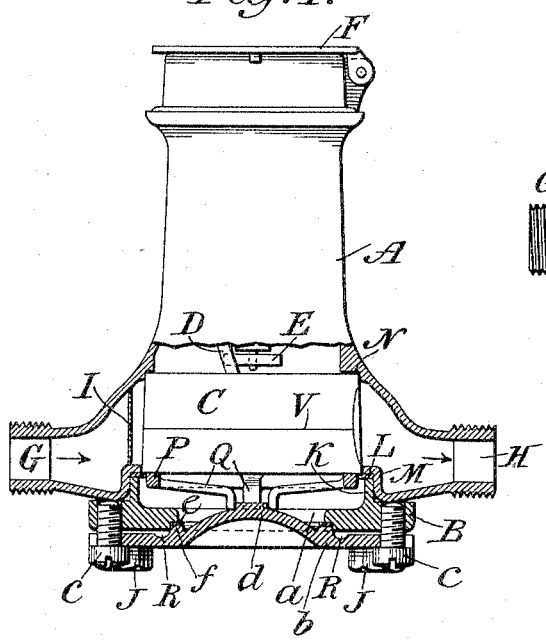
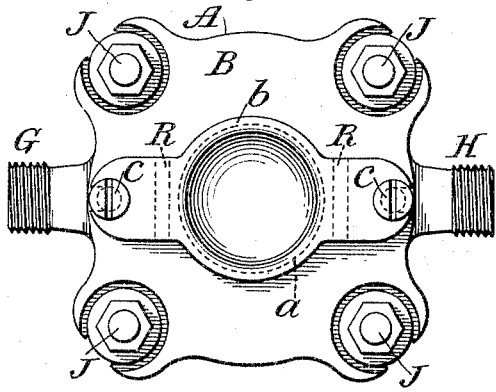
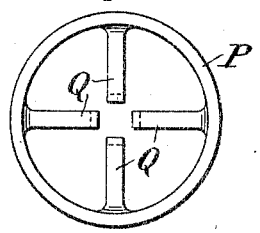
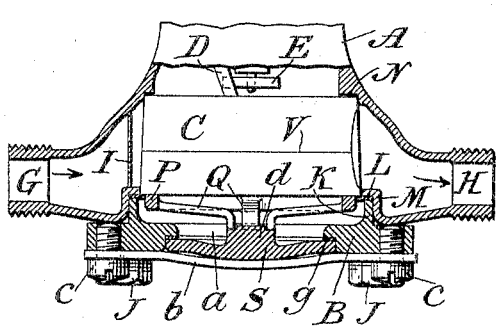
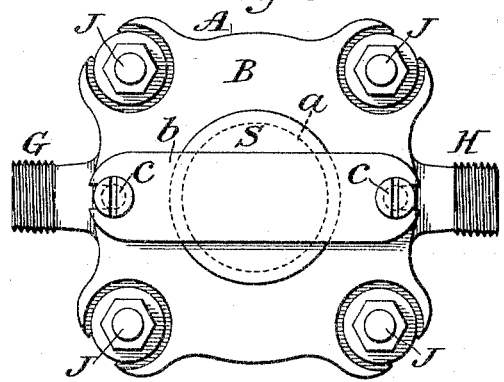
Attest:
A. N. Jesbera
Alfred O. Riddle
Inventor:
John Thomson
by Redding, Kiddle & Greeley
Attys.

No. 783,484.

Patented February 28, 1905.

UNITED STATES PATENT OFFICE.

JOHN THOMSON, OF NEW YORK, N. Y., ASSIGNOR TO NEPTUNE METER COMPANY, OF NEW YORK, N. Y., A CORPORATION OF NEW JERSEY.

WATER-METER.

SPECIFICATION forming part of Letters Patent No. 783,484, dated February 28, 1905.

Application filed October 19, 1903. Serial No. 177,619.

*To all whom it may concern:*

Be it known that I, JOHN THOMSON, a citizen of the United States, residing in the borough of Manhattan, in the city of New York, in the county and State of New York, have invented certain new and useful Improvements in Water-Meters, of which the following is a specification.

This invention relates primarily to water-meters, and in the accompanying drawings, forming a part hereof—

Figure 1 is a view, partly in elevation and partly in vertical section, of a water-meter embodying my invention. Fig. 2 is a bottom plan view of the meter shown in Fig. 1. Fig. 3 is a detail view of the bracket or spider for supporting the internal disk-chamber casing. Fig. 4 is a view of the lower portion of a water-meter of the general construction shown in Fig. 1, the upper part being broken away, partly in elevation and partly in vertical section, embodying a modification of certain of the parts; and Fig 5 is a bottom plan view of the meter shown in Fig. 4.

This invention is based upon the well-known fact that water when frozen increases in volume. The expansion due to the transformation is practically irresistible, the result being that when water freezes in a closed vessel the vessel will be likely to be destroyed unless some provision is made to save the essential or operative parts thereof under the stress, as by providing some part designedly made to yield or break under the stress.

The meter shown in the accompanying drawings is a disk water-meter, and, referring to Figs. 1, 2, and 3, A is the main or outer casing; B is the lower inclosing head or bottom therefor; C is the internal casing or disk-chamber or chamber containing the nutating-disk; D is the spindle attached to the ball of the disk; E is the arm which is connected to the shaft forming a part of the registering mechanism located within the outer inclosing case A above the disk-chamber C, the registering mechanism not being shown; F is the hinged cover inclosing the dial and pointers, (not shown;) G is the inlet-port, and H the outlet-port, of the meter, and I is the usual screen for excluding from the meter foreign matter.

The shape of the bottom B is shown in Fig. 2, being rectangular with rounding corners, each of which being slightly recessed, as shown, whereby to properly receive the bolts J and firmly secure the bottom to the outer casing A in a water-tight manner by means of the perpendicular upwardly-projecting annular flange K, which impinges upon the gasket L, and the overturned inwardly-projecting flange M of the main casing forming the seat for the gasket. The bottom B has a central orifice or aperture $a$, which is designed to be covered and closed by a separate flap or piece $b$, which is secured to the under side of the bottom B by the bolts $c$. The central portion of this flap $b$ is arched or concaved, as shown more clearly in Fig. 1, and on the summit of the arch is a stud $d$, and in order to render the joint between the flap $b$ and the bottom B water-tight a gasket $e$ is provided, which is held to its seat in the bottom B by the perpendicular upwardly-projecting annular flange $f$ of the flap $b$, as shown in Fig. 1. In order to support the disk-chamber casing C and to hold it to its seat N on the inside of the main casing A, a bracket or spider is provided, preferably of the construction shown in Figs. 1, 3, and 4. In the construction of this supporting member shown in the drawings P is a ring having inwardly-projecting radial arms Q, the inner ends of which depend and are designed to rest upon the flap $b$, as shown in Fig. 1. The outer diameter of the ring P, as shown, is very nearly of the same diameter as the diameter of the bottom of the disk-chamber C, furnishing thereby a large support for the disk-chamber; but I desire it to be understood that my invention is not limited to the particular construction of supporting member for the disk-chamber shown in the drawings and hereinabove described, nor that the supporting member shall spread across the entire bottom of the disk-chamber, the essential function of the supporting member being that it shall furnish an adequate support for the disk-chamber casing, the depending arms or prongs Q of the supporting member or bracket encircling the stud $d$ on the flap $b$, as shown in Fig. 1, whereby the supporting-bracket is held in central position.

The position and arrangement of the several parts when the meter is in normal operative condition is shown in Fig. 1, and in order to save the operative parts of the meter from destruction in the event the water within the meter should freeze a section of the flap $b$ is weakened by the formation in one of its surfaces, as the inner or upper surface, of the grooves R R, (shown in cross-section in Fig. 1 and in dotted lines in Fig. 2,) this weakened section being designed to yield, break, or blow out under the expansive force of the frozen water, the yielding or rupture taking place at the grooves R R.

In practical use of the meter shown in Figs. 1, 2 and 3 the upper portion of the outer inclosing case above the disk-chamber would contain water, the lower portion of the outer inclosing case would contain water, including the space below the bottom of the disk-chamber surrounding the supporting-bracket, and the disk-chamber itself would contain water. All of the parts of the meter, including the weakened section of the flap $b$, would be designed to withstand the ordinary pressures in service—such as the hydrostatic head, water-ram, and the like; but the weakened section would be designed to yield under excesssive pressure, such as that due to the freezing of the contained water. It is of course not possible to definitely state in advance the exact manner of freezing or the location within the meter where the freezing would first take place under all circumstances of service; but no matter where the freezing occurs or whether it proceeds progressively from all parts of the interior whenever the pressures within the meter becomes greater than the meter is designed normally to withstand this excessive pressure will travel in the direction of least resistance—to wit, in the structure shown in the direction toward the weakened section of the flap $b$—and will disrupt or fracture this weakened section at one or the other, or both, of the grooves R, and thereby afford the requisite relief to the pressure. If, for example, the entire body of water within the meter should have frozen, with the relief of pressure consequent upon the rupture of the weakened section of the flap $b$ the disk-chamber casing will have been forced away from its seat N by the pressure of the ice above it, and the disk-chamber casing will also have separated into its two component parts at the line of separation V by the pressure of the ice within it, and the ice will flow through the opening in the bottom B and the opening in the flap $b$ produced by the fracture or blowing out of the weakened section of the flap $b$ and the disk-chamber and the supporting-bracket will move with the moving or flowing of the ice, and under some circumstances a plug of ice will protrude through the opening. If the entire body of water within the meter shall, however, not have become frozen, but yet the pressure be too great, then when the weakened section of the flap $b$ yields or gives way the water within the meter-case will run out of the opening, thus affording the requisite relief and permitting the ice to flow and accommodate itself within the meter-casings.

In the construction of the various parts of the meter shown in Figs. 1, 2, and 3 I prefer to make the outer inclosing case or main casing A of composition metal which will possess a high degree of tenacity and flexibility, the disk chamber-casing C of bronze, the supporting bracket O of more ductile composition, and the bottom B and flap $b$ of cast-iron or low-grade brass.

From the foregoing it will thus be observed that in the event of freezing none of the essential operative parts of the meter will be damaged, and the only consequence of such freezing will be to cause the weakened section of the flap $b$ to yield or break, and in order to restore the meter to its operative condition again it will only be necessary to furnish a new flap $b$ and assemble the parts, securely uniting them together in the manner hereinbefore explained.

I do not limit myself to any particular dimension or size of weakened section or area in the flap $b$, for it is obvious that the relative size of this weakened section will depend in some measure upon the character of metals of which the several parts of the meter are composed. When the several parts are made of the metals hereinbefore referred to, I have found that the relative area of weakened section shown in Fig. 1 is entirely adequate to afford the requisite relief; nor do I limit myself to the particular manner of weakening this section illustrated in Figs. 1 and 2, for it is obvious that this weakening may be variously produced. Where the diameter of the opening in the bottom B, which is closed by the flap $b$, is less than the diameter of the disk-chamber casing C or its supporting-bracket, the disk-chamber casing and the supporting-bracket will be prevented from dropping through the opening in the bottom B when the weakened section of the flap $b$ has been blown out and the ice has melted, as will be readily understood.

Referring to Figs. 4 and 5, the general construction and arrangement of the parts heretofore described in connection with Figs. 1, 2, and 3 are the same in the construction of meter shown in Figs. 4 and 5, the parts in Figs. 4 and 5 corresponding to the parts in Figs. 1, 2, and 3 being similarly lettered.

In the construction of meters shown in Figs. 4 and 5 the bottom B is rectangular, with rounding corners, slightly recessed, and this bottom is firmly secured to the outer or main casing A by the bolts J, the same as in Figs. 1 and 2. The bottom is preferably made of cast-iron or low-grade brass and is provided with a central aperture, which is fitted with an inclosing piece or plug S, which is securely held in position by the separate flap $b$, of spring metal, this flap $b$ being fastened to the bottom B by the bolts $c$, and the joint between the plug S and the bottom B is rendered water-tight by the gasket $g$. The plug S is provided with the stud $d$, which is encircled by the prongs Q of the supporting-bracket for the disk-chamber in order to hold the bracket in central position, as heretofore explained.

In the construction shown in Figs. 4 and 5 if the water within the meter should freeze, as hereinbefore referred to in connection with the meter shown in Figs. 1 and 2, the pressure induced thereby will when it has become greater than the flap $b$ will normally withstand cause the flap $b$ to yield or deflate downwardly and outwardly, thus affording the requisite relief for the pressure and permitting the ice within the meter to move or accommodate itself within the consequent enlarged space, the disk-chamber $l$, the supporting-bracket therefor, and the plug S moving downwardly with the movement of the ice. This downward movement of the plug $c$ will separate the plug from the bottom, permitting any water that remains unfrozen in the meter to flow therethrough, affording the requisite relief where the entire contents of the meter are not frozen. When the ice has melted, the resilient or retroactive flap $b$ will automatically restore the plug S, the supporting-bracket, and the disk-chamber to their normal operative positions, as shown in Fig. 4, without the necessity of the reparation or replacement of any of the parts. Should, however, in any case the pressure be great enough to break the resilient flap $b$, it will only be necessary in such event to substitute a new resilient flap for the one broken, the same as heretofore explained in connection with the meter shown in Figs. 1 and 2.

What I have heretofore set forth with reference to the relief area of the opening in the bottom B in connection with the meter shown in Figs. 1 and 2 is applicable to the meter shown in Figs. 4 and 5.

While, as stated before, this invention was devised primarily for use in connection with water-meters, yet I do not limit my invention to its use in connection with water-meters, *per se*, for my invention may be applied to other structures, and therefore while in the claims hereinafter following I claim my invention as applied to water-meters, yet I desire it to be understood that I use the term "water-meter" to include not only water-meters *per se*, but all analogous and other structures to which my invention may be applied.

In the claims hereinafter following I use the term "yielding" to include all sorts of yielding or bending and all sorts of breaking or fracture.

What I claim as my invention is—

1. In a water-meter, the combination with a main casing, of an internal casing, an inclosing head for the main casing, an orifice in said inclosing head, means to close said orifice adapted to yield under excessive interior pressure, means to support the internal casing held in position solely by the means that close the orifice in the inclosing head of the main casing, substantially as and for the purpose set forth.

2. In a water-meter the combination with a main casing, of an integral casing, an inclosing head for the main casing, an orifice in said inclosing head, a flap to close said orifice adapted to yield under excessive interior pressure and a support for the internal casing held in position solely by the yielding flap, substantially as and for the purpose set forth.

3. In a water-meter, the combination with a main casing, of an internal casing, an inclosing head for the main casing, an orifice in said inclosing head, a device to close said orifice adapted to yield under excessive interior pressure and a support for the internal casing itself supported solely by said yielding device, substantially as and for the purpose set forth.

4. In a water-meter, the combination with a main casing, of an internal casing, an inclosing head for the main casing, a central orifice in said inclosing head, a device to close said orifice adapted to yield under excessive interior pressure, a central stud on said yielding device and a support for the internal casing provided with depending feet or prongs which encircle said stud, substantially as and for the purpose set forth.

5. In a water-meter, the combination with a main casing of an internal casing, an inclosing head for the main casing, an orifice in said inclosing head, means to close said orifice adapted to yield under excessive interior pressure, the diameter of the orifice in the inclosing head of the main casing being less than the diameter of the internal casing, substantially as and for the purpose set forth.

6. In a water-meter, the combination with a main casing of an internal casing, an inclosing head for the main casing, an orifice in said inclosing head, means to close said orifice adapted to yield under excessive interior pressure, a support for the internal casing, the diameter of the orifice in the inclosing head of the main casing being less than the diameter of the support for the internal casing, substantially as and for the purpose set forth.

7. In a water-meter the combination with a main casing, of an internal casing, an inclosing head for the main casing, an orifice in said inclosing head, means to close said orifice adapted to yield under excessive interior pressure, the area of the orifice in the inclosing head of the main casing being less than the area of the bottom of the internal casing, substantially as and for the purpose set forth.

This specification signed and witnessed this 5th day of October, A. D. 1903.

JOHN THOMSON.

In presence of—
ALFRED W. KIDDLE,
A. N. JESBERA.